Nov. 13, 1956  A. ST. J. BOWIE  2,770,069
AGRICULTURAL SPRAYING AND DUSTING APPARATUS
Filed Nov. 24, 1951  7 Sheets-Sheet 1

INVENTOR
ADRIAN ST. J. BOWIE
BY Hans G. Hofmeister
ATTORNEY

Nov. 13, 1956 A. ST. J. BOWIE 2,770,069
AGRICULTURAL SPRAYING AND DUSTING APPARATUS
Filed Nov. 24, 1951 7 Sheets-Sheet 6

FIG_8

INVENTOR
ADRIAN ST. J. BOWIE
BY Hans G. Hoffmeister
ATTORNEY

United States Patent Office 2,770,069
Patented Nov. 13, 1956

2,770,069

AGRICULTURAL SPRAYING AND DUSTING APPARATUS

Adrian St. J. Bowie, San Jose, Calif., assignor to Food Machinery and Chemical Corporation, San Jose, Calif., a corporation of Delaware Application November 24, 1951, Serial No. 258,084

11 Claims. (Cl. 43—148)

This invention relates to agricultural spraying and dusting apparatus of the type wherein a pesticidal spray or dust is fed into an air blast discharged by the apparatus, thereby creating a fine fog of spray or dust, as the case may be, for contact with plants, particularly trees, bushes and the like.

One object of the present invention is to provide an improved agricultural spraying and dusting apparatus of the air blast type.

Another object is to provide a spraying and dusting apparatus which may be mounted upon and connected with a conventional agricultural duster or spray rig for the purpose of converting them to an air blast type dusting or spraying machine.

Another object is to provide an agricultural spraying and dusting apparatus having an improved air blast deflecting, shaping and discharging mechanism.

Another object is to provide an agricultural spraying and dusting apparatus having an air blast creating mechanism with adjustable air blast deflecting, shaping and discharging means, whereby the entire air blast can be discharged in any desired direction, or may be divided and discharged in different directions.

Another object is to provide an agricultural spraying and dusting apparatus of the air blast type having movable means for delivering pesticide to said air blast at a predetermined point wherein the point at which pesticide is delivered to said air blast may be varied.

These and other objects and advantages of the invention will become apparent from the following description and the accompanying drawings wherein:

Fig. 3 is a fragmentary plan view of the rig shown in Fig. 2.

Fig. 9 is a diagrammatic vertical section through the device shown in Fig. 8.

In the embodiment of the invention shown in Figs. 1 to 7, inclusive, 11 (Fig. 1) designates a conventional spray rig with supporting wheels 12 adapted to be drawn in the direction of the arrow A between rows of trees or the like by a tractor (not shown). A tank 13 provided on the spray rig 11 supplies spray solution to a pump (not shown) mounted at the front of the rig 11 within the housing 14. The pump furnishes spray solution under high pressure to flexible hoses 15,15' for distribution to spray nozzle manifolds 16,16'. The delivery of spray solution to the individual hoses 15,15' is controlled by cutoff valves 17,17' (Figs. 1 and 4) which may be actuated from the forward end of the spray rig by means of control rods 18,18'.

An air blast creating apparatus 21 is mounted at the rear of the spray rig 11 on a horizontal frame 22 bolted to the rear lower portion of the solution tank 13 through the medium of upright arms 23. The frame 22 is rectangular in shape comprising two parallel longitudinal channels 24 and 25 (Fig. 2) and two parallel transverse channels 28 and 29, said channel 29 extending laterally beyond the channels 24 and 25 and having the aforementioned arms 23 secured to its ends.

Figure 1:
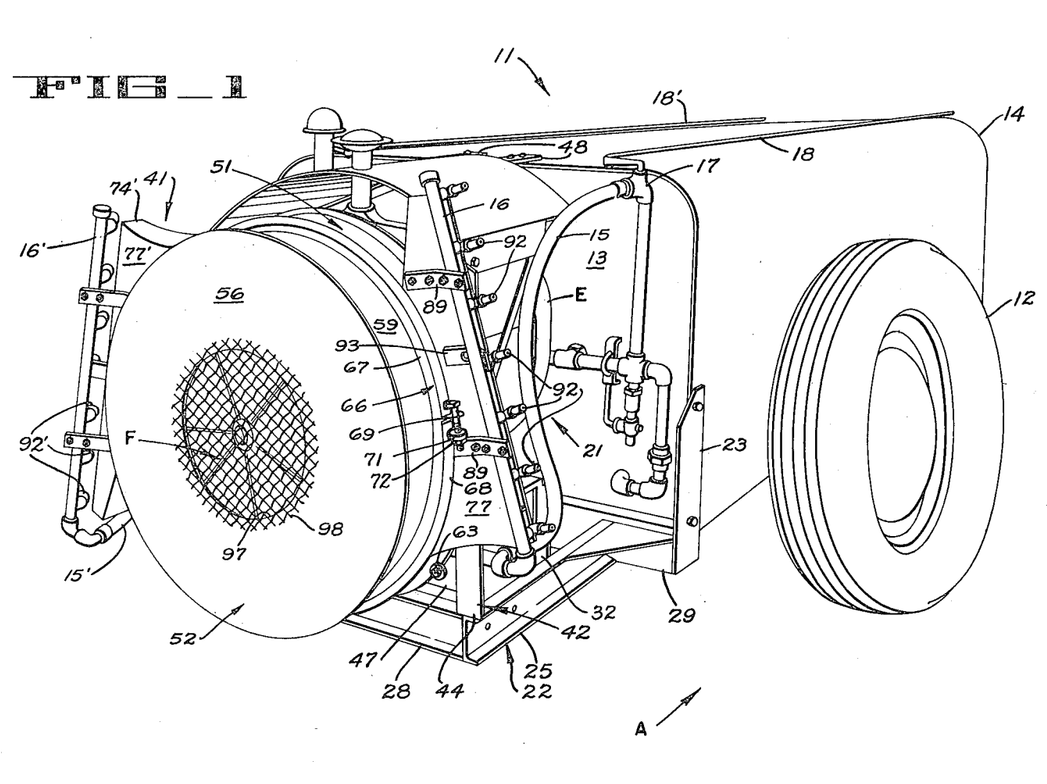
Fig. 1 is a rear perspective view of a conventional agricultural spray rig carrying an embodiment of the present invention adapted for use as an agricultural air blast sprayer.
Figure 2:
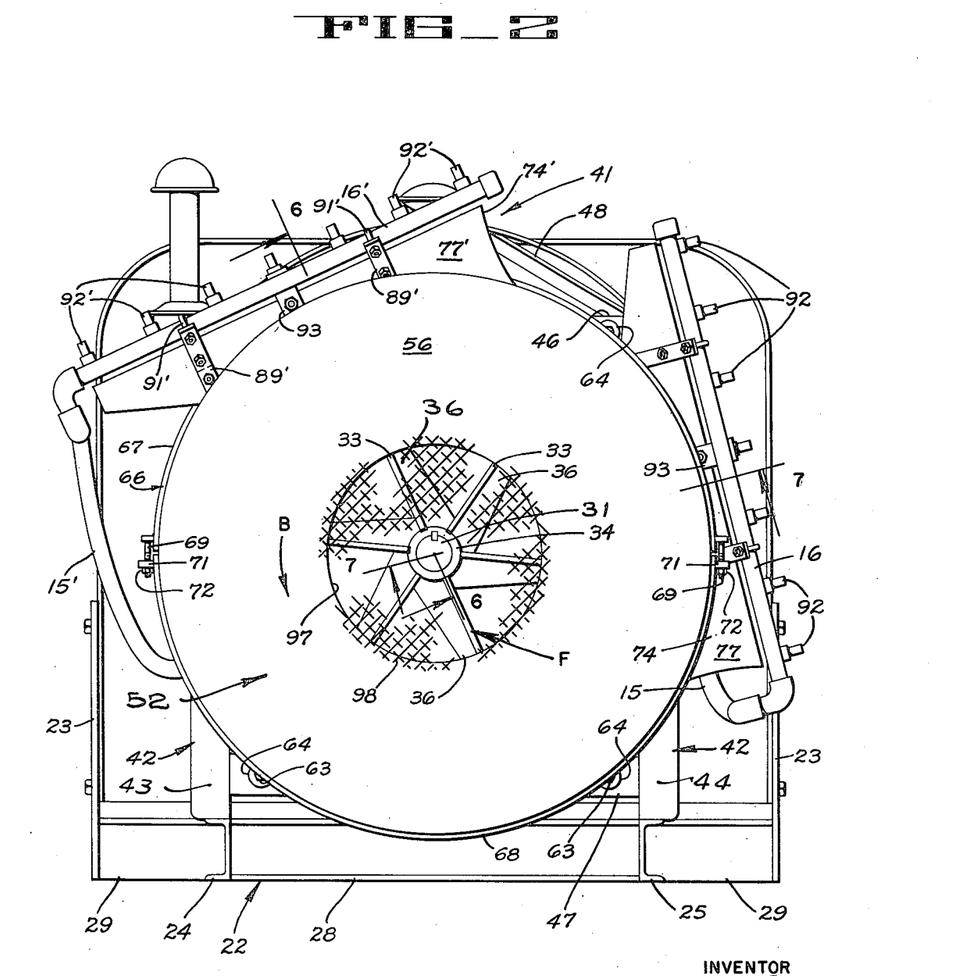
Fig. 2 is a rear elevation of the rig shown in Fig. 1, some parts being omitted and other parts being shown in a different position.
Figure 4:
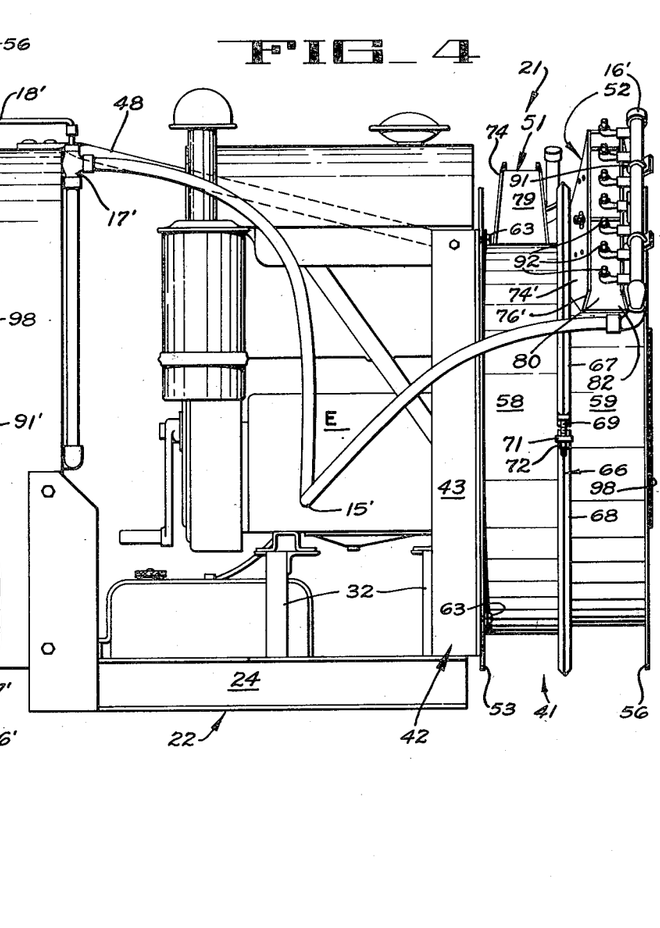
Fig. 4 is a fragmentary side view of said rig.
Figure 5:
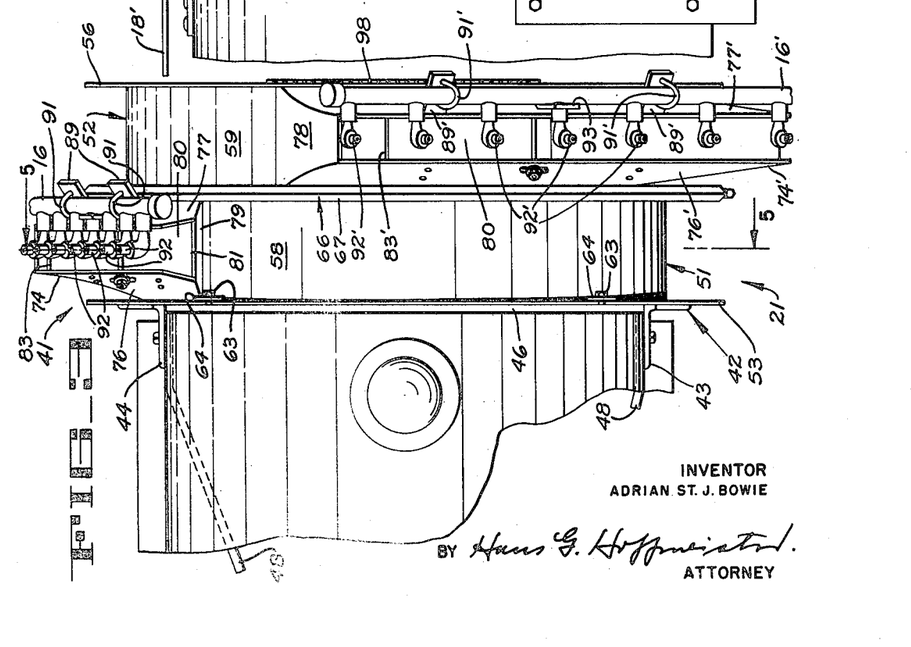
Fig. 5 is a section taken along the line 5—5 of Fig. 3, certain parts being shown in a different position.

The air blast creating apparatus 21 (Figs. 1, 4 and 5) comprises an internal combustion engine E and a centrifugal fan F (Fig. 5), the latter being keyed to the rearwardly extending drive shaft 31 of said engine E and adapted to be rotated by said engine E in the direction of the arrow B. Engine mounts 32 (Figs. 1 and 4) support the engine E above the frame 22 with the fan F projecting beyond the rear, transverse, frame channel 28. The fan F (Figs. 5, 6, and 7) is formed with a plurality of identical, wide blades 33 of inwardly tapering shape radiating from a hub 34, each blade 33 being braced by a stiffener 36 (Fig. 5).

The fan F is enclosed by an air blast deflecting, shaping and discharging apparatus 41 (Figs. 1 through 5) mounted on a vertical frame 42 secured at the rear of the horizontal frame 22. The frame 42 comprises two upright channels 43 and 44 (Fig. 3) connected adjacent their upper and lower ends, respectively, by transverse channels 46 and 47 (Fig. 5). The vertical channels 43 and 44 rest on and are welded to the rear end of the longitudinal, frame channels 24 and 25, respectively. Straps 48 (Figs. 3 and 4) bolted to the upper ends of said vertical channels 43 and 44 and to the solution tank 13 brace the frame 42, which supports the entire weight of the air blast deflecting mechanism 41, thereby insuring the rigidity of said frame 42.

The air blast deflecting apparatus 41 comprises two similar housings 51 and 52 (Fig. 3) having annular end heads 53 and 54, and 56 and 57 (Fig. 6), respectively, joined by bands 58 (Fig. 6) and 59 (Fig. 7), respectively, which surround the fan F. The bands 58 and 59 are secured between their respective end heads so as to form a spiral or volute (see Fig. 5). Openings 61, 61' (Figs. 5 and 6) are provided between the ends of said spiral bands 58 and 59, respectively, for the release of air from each of the housings 51 and 52.

The housing 51 is adjustably fastened to the frame 42 by means of bolts 63 (Fig. 5) which clamp the end head 53 between the transverse frame channels 46 and 47 and washers 64 mounted upon the bolts 63. Said housing 51 may be rotated about its longitudinal axis and held in any angular position relative to the spray rig 11 by loosening the bolts 63, manually turning said housing to the desired angular position as it rests loosely on said bolts 63 and then re-tightening said bolts.

The housing 52 (Fig. 4) is adjustably fastened to the housing 51 through the medium of a clamp ring 66 (Figs. 1, 2, 3 and 4) consisting of two semi-circular V-sectioned portions 67 and 68 (Figs. 2 and 6) which hold the end heads 54 and 57 contiguously against one another.

Figure 6:
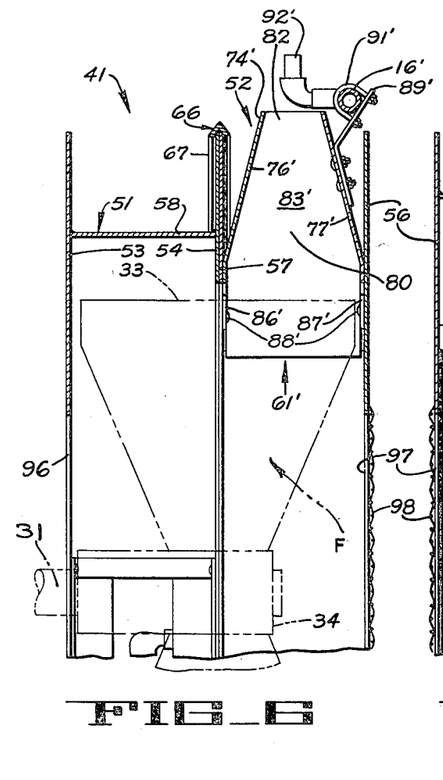
Fig. 6 is a section taken along the line 6—6 of Fig. 2, certain parts being shown in phantom lines.
Figure 7:
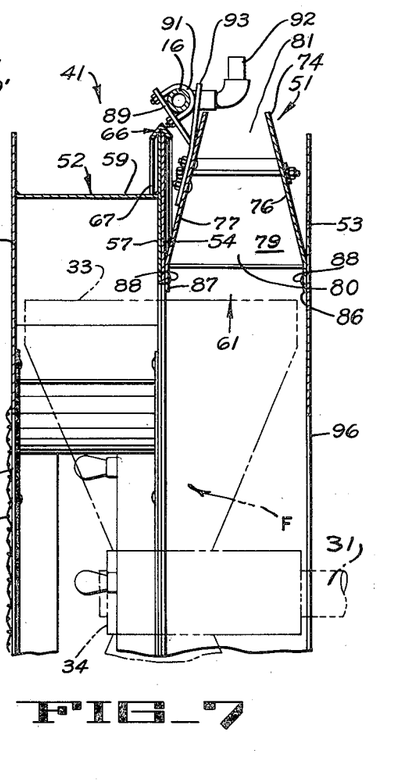
Fig. 7 is a section taken along the line 7—7 of Fig. 2, certain parts being shown in phantom lines.
Figure 8:
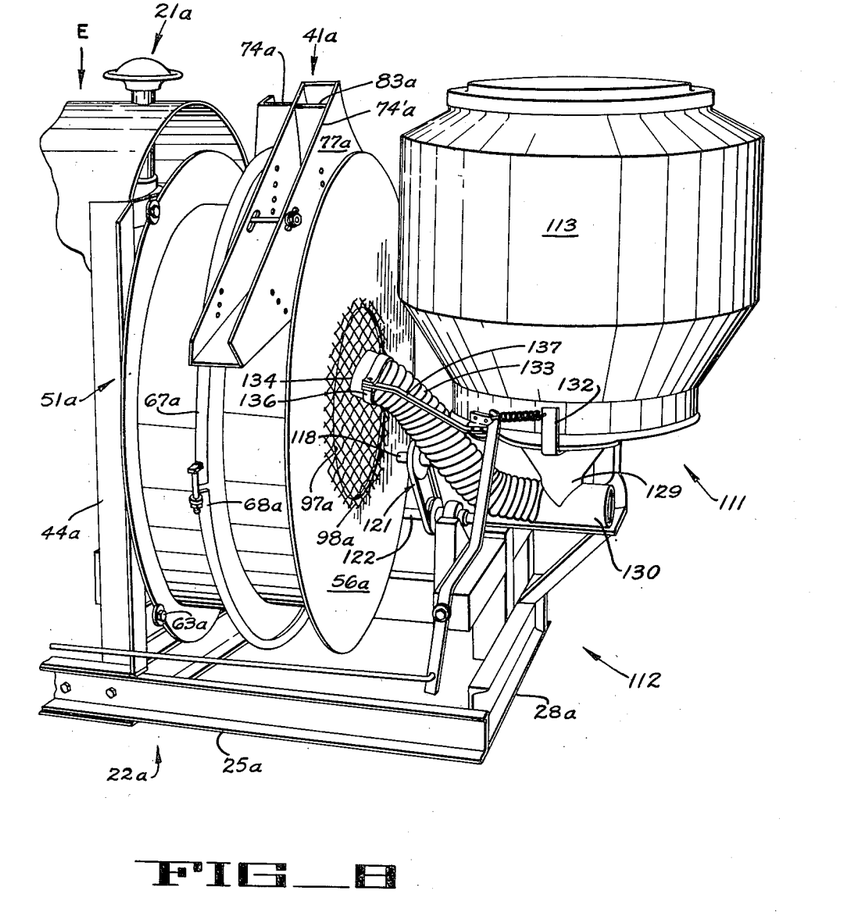
Fig. 8 is a rear perspective view of an embodiment of the invention adapted for use as an agricultural air blast duster.
Figure 13:
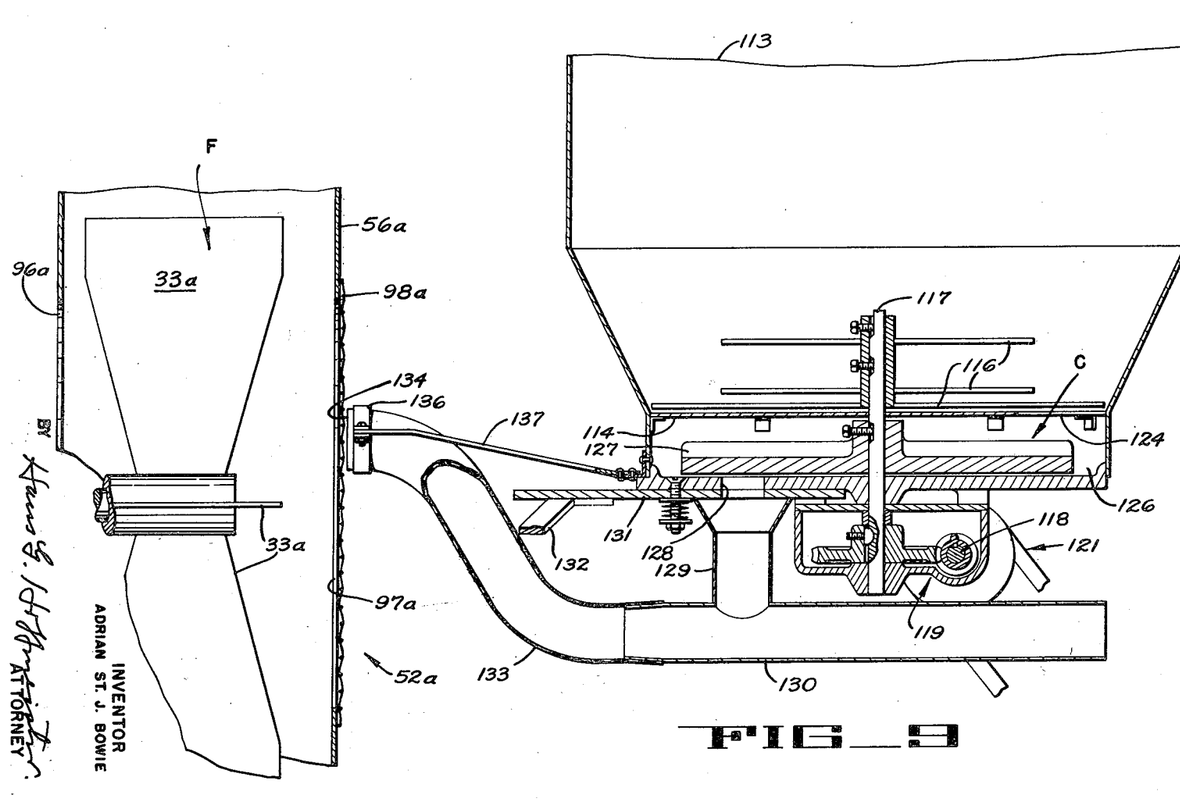

The two semi-circular ring portions 67 and 68 (Fig. 2) are clamped together by means of machine bolts 69 whose heads are welded to the outer periphery of the portion 67 adjacent its ends. The bolts 69 are arranged to protrude through rings 71 welded to the outer periphery of the portion 68 adjacent its ends, and a nut 72 threaded on the free end of each bolt 69 cinches the two portions 67 and 68 around the periphery of the contiguous end heads 54 and 57 (Fig. 6). The housing 52 may be rotatably adjusted relative to the housing 51 and the spray rig 11, by slightly loosening the ring clamp 66 and manually turning said housing 52 to the desired angular position and then re-tightening said ring clamp 66. As will be apparent from the foregoing description, with the housing 52 tightly secured to the housing 51 the entire air blast deflecting apparatus 41 may be rotatably adjusted relative to the spray rig 11 in the manner previously described for the housing 51 alone.

In order to control the direction of the air released from the housings 51 and 52 they may be turned, as just described, in any desired position of angularity. The entire air output of the apparatus may thus be delivered in any desired direction by placing the openings 61, 61' side by side and facing them in the desired direction, or it may be divided and simultaneously released in two separate directions, the corresponding adjustment of the apparatus being shown in Fig. 1.

The openings 61, 61' (Figs. 5 and 6) in the housings 51 and 52 are provided with air nozzles 74, 74' (Figs. 1 through 5), respectively, for finally shaping and discharging the air blast developed by the fan F. Since nozzles 74 and 74' are identical, only the nozzle 74 attached to the housing 51 will be described, and the parts of the nozzle 74' corresponding with those of the nozzle 74 will be indicated by the same numeral with a prime (') added.

The nozzle 74 (Figs. 3 and 7) is formed with two elongated outwardly converging side plates 76 and 77 joined at one end by a curved plate 78 (Fig. 5) which forms a recurved extension of the band 58. At the opposite end of the nozzle 74 the plates 76 and 77 (Figs. 3, 4 and 5) recede from the band 58 and a trapezoidal plate 79 is secured between said plates thus forming an outwardly flaring air passage 80 (Fig. 5) in said nozzle 74. There is no end wall or plate at the end of the nozzle 74 adjacent the trapezoidal plate 79 and the outer edges of the converging nozzle side plates 76 and 77 do not meet, thereby providing openings at 81 and 82, respectively, for discharging air entering the nozzle 74.

Due to the spiral shape of the band 58, the air blast leaves the housing 51 through the opening 61 in a direction more or less tangent to the fan blades 33 as they pass said opening 61. Hence, the major portion of the air blast tends to issure from the nozzle 74 through the opening 81 and the left and center portions of the opening 82 (Fig. 5) with very little air flow taking place through the right portion of said opening 82. In order to bring about an even discharge of air along the entire length of the opening 82 a curved vane 83 (Figs. 5 and 6) is provided in the right side (Fig. 5) of the nozzle 74 between the side plates 76 and 77. Said vane 83 is shaped similarly to the end plate 78 and extends inwardly beyond the opening 61 into the housing 51 so that it intercepts a portion of the air passing through the opening 61 and directs it out of the nozzle 74 at the right hand side of the opening 82.

The margins of the side plates 76 and 77 (Figs. 5 and 7) adjacent the opening 61 are turned inwardly forming parallel flanges 86 and 87, respectively, for securing the nozzle 74 to its housing 51. These flanges 86 and 87 are tightly held in place against the end heads 53 and 54 by rivets 88. The corresponding flanges 86' and 87' of the nozzle 74' are tightly held in place against the end heads 56 and 57 by rivets 88'.

The spray nozzle manifold pipe 16 (Figs. 2, 3 and 7) is fastened to the air nozzle 74 alongside the opening 82 by means of brackets 89 bolted to the side plate 77 and provided with U-bolts 91 for engaging said manifold pipe 16. The manifold pipe 16 has a plurality of spray nozzles 92 (Figs. 3 and 7) connected therewith which extend laterally from said pipe 16. The outlet orifices of these nozzles 92 face outwardly and are positioned directly over the opening 82, thereby placing them squarely in the middle of the air stream as it leaves the air nozzle 74. Said spray nozzles 92 and their supporting manifold pipe 16 are maintained in their proper position by a locking strap 93 (Fig. 7) attached to one of the spray nozzles 92 and bolted to the air nozzle side plate 77. The spray nozzle manifold pipe 16' is fastened to the air nozzle 74' in a manner identical with that just described for the pipe 16 and nozzle 74.

In operation, the fan F draws air inside the housing 51 and 52 through front and rear intake openings 96 and 97 (Figs. 6 and 7), respectively, the rear intake opening 97 having a screen guard 98 fastened over it. The air thus drawn within the apparatus 41 is directed into two spiral paths formed by the bands 58 and 59 and their respective end heads (Fig. 5) and then discharged from the air nozzles 74 and 74' in two powerful streams. At the same time by operation of the pump within the housing 14, a pesticidal solution is sprayed into these air streams from the nozzles 92 and 92' and is immediately picked up by said air streams and formed into a fine fog of spray solution, which will penetrate even the densest arboreal foliage, covering it evenly with pesticidal material.

The embodiment of the invention disclosed in Figs. 8 and 9 is adapted to distribute a pesticidal dust rather than a spray solution and it may be mounted on the rear of a conventional type duster (not shown), a spray rig, such as that shown in Figs. 1 through 5 of the drawings, or it may be mounted on a separate wheeled frame (not shown) for conveyance through a field or orchard. In any case the air blast creating apparatus, the air blast deflecting apparatus, and their supporting frames of the air blast duster (Figs. 8 and 9) are identical with those previously described in connection with the air blast sprayer, disclosed in Figs. 1 through 7, and hence no separate description of them will be made. However, the parts of the air blast duster corresponding with parts of the air blast sprayer will be indicated by the same numeral with an "*a*" added.

The only change necessary to convert the previously described air blast sprayer to an air blast duster is the removal of the spray nozzle manifold pipes 16 and 16' (Fig. 1) and their associated supplying and securing apparatus and the addition of a conventional dust supplying apparatus 111 (Fig. 8). Said dust supplying apparatus 111 is mounted behind the air blast deflecting apparatus 41*a* on a stage 112 fastened to the frame 22*a* and extending rearwardly therefrom.

The dust supplying apparatus 111 has a hopper 113 (Fig. 9) for holding pesticidal dust and adjacent the floor 114 of said hopper there are provided a plurality of mixing blades 116 mounted upon a vertical shaft 117. The shaft 117 is driven by a horizontal shaft 118 through worm gearing 119, and the shaft 118 is rotated by a belt and pulley drive 121 engaged with a drive shaft 122 (Fig. 8) connected with a power take-off means (not shown) associated with engine E.

The blades 116 (Fig. 9) constantly agitate the dust assisting it to gravitate through an opening 124 in the floor 114 of the hopper 113 into a chamber 126, as indicated by the arrow C. A blade 127 secured on the shaft 117 then feeds the dust to an outlet port 128 in the floor of the chamber 126. There it falls through a pipe 129 into a flue 130 where it is picked up and mixed with air being sucked therethrough by the fan F. An apertured valve disc 131 pivoted to the floor of the chamber 126 and actuated from the front of the duster through a lever 132 secured to the bottom of said valve disc is used to regulate the flow of dust to the flue 130.

The discharge end of the flue 130 consists of a flexible hose 133 whose outlet opening 134 may be held in any desired position adjacent the air intake opening 97*a* by a collar 136 and an adjustable, flexible-metal, support strap 137 secured to the dust supplying apparatus 111. It is necessary that the hose 133 be adjustable because each time the housings 51a and 52a are turned in order to change their direction of air discharge, the air flow path within the air blast deflecting apparatus 41a changes, thus changing the optimum point for feeding dust to said apparatus 41a. Consequently, with each change in the angular position of the housings 51a and 52a, the hose 133 must be moved about in the area of the air intake opening 97a until the optimum dust feed position of said hose for the new position of the housings 51a and 52a is found.

In operation, the fan F (Fig. 9) draws air into the air blast deflecting apparatus 41a through the air intake openings 96a and 97a. Said fan F also draws a concentrated mixture of pesticidal dust and air into said apparatus 41a through the flue 130 and the opening 97a. The concentrated air-dust mixture thus drawn within the apparatus 41a intimately mixes with the main flow of air therein forming a fine fog of dust which is discharged from the nozzles 74a, 74'a of the air blast deflecting apparatus 41a in two powerful streams. In this manner the dust is thoroughly atomized and is carried by the air into contact with all of the foliage within reach of the fog streams.

While I have illustrated and described two embodiments of the present invention, it will be understood, however, that various other changes and modifications may be made in the details thereof without departing from the spirit and scope of the invention as set forth in the appended claims.

Having thus described the invention what I claim as new and desire to protect by Letters Patent is as follows:

1. An agricultural pesticide spraying and dusting apparatus comprising a frame, means on said frame for creating an air blast, an air blast deflector enclosing said air blast creating means and adjustably supported at one end only by said frame and disposed to receive and discharge said air blast in a predetermined direction, and means for delivering pesticide to said blast.

2. An agricultural pesticide spraying and dusting apparatus comprising a frame, a first air blast deflector mounted on said frame, a second air blast deflector supported in a cantilever manner solely by said first deflector, means enclosed within said first and second air blast deflectors for creating an air blast through each deflector, and means for delivering pesticidal material to said air blasts for acceptance thereby.

3. An agricultural pesticide spraying and dusting apparatus comprising a frame, a first air blast deflector, means adjustably supporting said first air blast deflector on said frame at one end only of said deflector, a second air blast deflector, means adjustably mounting said second deflector solely on said first deflector, means for creating and delivering an air blast to each deflector, and means for entraining pesticidal material in said air blasts for conveyance thereby.

4. An agricultural pesticide spraying and dusting apparatus comprising a frame, a first air blast deflector mounted on said frame and having a circular peripheral flange on an end thereof, a second air blast deflector having a circular peripheral flange on an end thereof disposed in supporting contact with the flange of said first deflector, means for adjustably clamping said flanges in contiguous alignment with each other to support the second deflector solely on the first deflector, means for creating and delivering an air blast to each deflector, and means for entraining pesticidal material in said air blasts for conveyance thereby.

5. An agricultural pesticide spraying and dusting apparatus comprising a frame, a rotary fan on said frame for creating an air blast, a spiral air blast deflector associated with said fan and provided with a radially extending flange and adapted to receive and discharge said air blast in a predetermined direction, means for adjustably securing said radial flange to said frame to mount the deflector on said frame in a cantilevered manner, and means for delivering a pesticide to said air blast.

6. An agricultural pesticide spraying and dusting apparatus comprising a frame, a first air blast deflector having first and second circular peripheral flanges on the opposite ends thereof, means for adjustably clamping the first of said flanges to said frame to thereby mount said deflector on said frame in a cantilevered manner for movement relative thereto, a second air blast deflector having a circular peripheral flange on an end thereof, the diameter of said flange being substantially equal to the diameter of the second flange on said first deflector, a V-sectioned clamp ring for adjustably clamping the second flange of said first deflector and the flange of said second deflector in contiguous alignment against each other to thereby mount the second deflector on the first deflector in a cantilevered manner, means for creating and delivering an air blast to each deflector, and means for entraining pesticidal material in said air blast for conveyance thereby.

7. An agricultural pesticide spraying and dusting apparatus comprising means for creating an air blast, a flexible hose for delivering a pesticide to said air blast at a predetermined point for conveyance thereby, and means adjustably supporting said hose for movement relative to said air blast.

8. An agricultural pesticide spraying and dusting apparatus comprising means for creating an air blast, an air blast deflector housing provided with an inlet opening and operatively associated with said air blast creating means and adjustable relative thereto for deflecting said air blast along a predetermined path, a supply conduit having a discharge end portion for delivering a pesticide to said air blast for conveyance thereby, and means adjustably mounting said discharge end portion adjacent the inlet opening of said housing for movement relative thereto.

9. An agricultural pesticide spraying and dusting apparatus comprising means for creating an air blast, a plurality of air blast shapers arranged to receive different portions of said air blast and to discharge them in predetermined directions, means adjustably mounting said shapers for movement relative to one another to vary the direction of discharge of said air blast portions, means for delivering pesticide to said air blast at a predetermined point, and means for adjustably supporting said delivery means for movement relative to said air blast.

10. An agricultural pesticide spraying and dusting apparatus comprising a blower to provide an air blast, a supply hopper adjacent said blower, a conduit having a discharge end portion arranged to deliver pesticide to the air blast and an inlet end portion communicating with the inside of said hopper and with the atmosphere, and means supporting the discharge end portion of said conduit for adjustable movement relative to said air blast to vary the single point of delivery of said pesticide.

11. An agricultural pesticide spraying and dusting apparatus comprising a frame, an air blast deflector mounted on said frame and provided with an air inlet, a blower disposed within said deflector on the downstream side of said air inlet for drawing air into said air inlet and directing an air blast through said deflector, an open ended conduit mounted on said frame having one end positioned adjacent said air inlet and the opposite end open to the atmosphere for inducing an auxiliary flow of air through the conduit, and means mounted on said frame in communication with said open ended conduit for introducing a pesticide into said induced auxiliary flow of air in said conduit for communication to said air blast and conveyance thereby as said blower is operated.

(References on following page)

References Cited in the file of this patent

UNITED STATES PATENTS

| | | |
|---|---|---|
| 423,121 | Brown | Mar. 11, 1890 |
| 1,282,697 | Johnson | Oct. 22, 1918 |
| 1,376,216 | Mittinger | Apr. 26, 1921 |
| 1,913,676 | Kerr | June 13, 1933 |
| 2,253,802 | Ness et al. | Aug. 26, 1941 |
| 2,429,374 | Shade | Oct. 21, 1947 |
| 2,587,240 | Spreng | Feb. 26, 1952 |
| 2,619,767 | Woock | Dec. 2, 1952 |
| 2,641,504 | Robinson | June 19, 1953 |
| 2,661,242 | Kurzbin | Dec. 1, 1953 |
| 2,667,717 | Daugherty | Feb. 2, 1954 |

FOREIGN PATENTS

| | | |
|---|---|---|
| 122,941 | Great Britain | Feb. 13, 1919 |
| 140,664 | Great Britain | Apr. 1, 1920 |
| 588,592 | Great Britain | May 28, 1947 |